UNITED STATES PATENT OFFICE.

ANNESS R. KINYON, OF DOWNER'S GROVE, ILLINOIS.

IMPROVEMENT IN HAIR-RESTORATIVE COMPOSITIONS.

Specification forming part of Letters Patent No. 172,449, dated January 18, 1876; application filed September 26, 1874.

*To all whom it may concern:*

Be it known that I, Mrs. ANNESS R. KINYON, of Downer's Grove, in the county of Du Page and State of Illinois, have invented a new and Improved Hair-Restorer, of which the following is a specification:

My improved restorer consists, essentially, of extract of wild or native grape-vine, with which I combine salt and castor-oil, to cleanse and heal and prepare the scalp for the restoring properties of the grape-vine, and I also combine alcohol in sufficient quantity to cut the oil and keep the preparation sweet; also a few drops or so of oil of winter-green for scenting the restorer, but any other approved substance may be used for this purpose.

To prepare, say, a half pint of the restorer, I take about a quart of the leaves and branches of grape-vine well packed together; boil in a pint of soft water in a porcelain kettle until the liquid is reduced about one-half; then strain with a fine strainer, and add half a dram of salt; then put one dram of castor-oil with half a dram of alcohol and two drops of oil of winter-green, and mix the whole with the extract of grape-vine. When cold the compound is ready for use.

Having thus described my invention, I claim as new and desire to secure by Letters Patent—

The hair-restoring compound herein described, consisting of extract of grape-vine, salt, castor-oil, and alcohol, in about the proportions specified.

MRS. ANNESS R. KINYON.

Witnesses:
 JOHN HOLST,
 WILLIAM R. PLUM.